US 12,489,676 B2

(12) United States Patent
Toeda et al.

(10) Patent No.: US 12,489,676 B2
(45) Date of Patent: Dec. 2, 2025

(54) NETWORK NODE

(71) Applicant: NTT DOCOMO, INC., Tokyo (JP)

(72) Inventors: Teruaki Toeda, Tokyo (JP); Kenji Kai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 157 days.

(21) Appl. No.: 17/252,873

(22) PCT Filed: Jun. 21, 2018

(86) PCT No.: PCT/JP2018/023711
§ 371 (c)(1),
(2) Date: Dec. 16, 2020

(87) PCT Pub. No.: WO2019/244318
PCT Pub. Date: Dec. 26, 2019

(65) Prior Publication Data
US 2021/0258214 A1 Aug. 19, 2021

(51) Int. Cl.
*H04L 41/0813* (2022.01)
*H04W 36/00* (2009.01)
*H04W 36/08* (2009.01)

(52) U.S. Cl.
CPC ..... *H04L 41/0813* (2013.01); *H04W 36/0064* (2023.05); *H04W 36/00692* (2023.05); *H04W 36/00698* (2023.05); *H04W 36/087* (2023.05)

(58) Field of Classification Search
CPC .......... H04L 41/0813; H04W 36/0055; H04W 36/08; H04W 36/0069; H04W 76/15;
(Continued)

(56) References Cited

U.S. PATENT DOCUMENTS

| 2012/0287902 A1* | 11/2012 | Bufe | H04W 36/0011 370/331 |
| 2013/0165124 A1* | 6/2013 | Liang | H04W 36/0061 455/437 |

(Continued)

FOREIGN PATENT DOCUMENTS

| EP | 2983407 A1 | 2/2016 |
| EP | 3732933 A1 | 11/2020 |
| WO | 2019/160743 A1 | 8/2019 |

OTHER PUBLICATIONS

Intel, Delta/full configuration for bearer type change & SN change (R2-1712666), 2017, 3GPP TSG-RAN WG2 Meeting #100, whole document (Year: 2017).*

(Continued)

*Primary Examiner* — Michael Thier
*Assistant Examiner* — Jose L Perez
(74) *Attorney, Agent, or Firm* — Osha Bergman Watanabe & Burton LLP

(57) ABSTRACT

A network node is a first network node of a communication system including a user device and a plurality of network nodes, the network node including a reception unit that receives an inter-node message relating to a configuration of the user device from a second network node; a determination unit that determines whether a manner of updating the configuration of the user device is a full configuration or a delta configuration based on the inter-node message; and an updating unit that updates the configuration of the user device with the full configuration or the delta configuration based on the determination.

3 Claims, 11 Drawing Sheets

(58) Field of Classification Search
CPC ........... H04W 92/20; H04W 36/00692; H04W 36/00698; H04W 36/087; H04W 36/0064
See application file for complete search history.

(56) References Cited

U.S. PATENT DOCUMENTS

| | | | | |
|---|---|---|---|---|
| 2015/0172988 | A1* | 6/2015 | Lai ................. | H04W 36/08 455/436 |
| 2015/0312811 | A1* | 10/2015 | Lei ................. | H04W 36/38 370/331 |
| 2016/0249259 | A1* | 8/2016 | Park ............... | H04W 36/0058 |
| 2016/0295469 | A1* | 10/2016 | Kitazoe ........... | H04L 69/08 |
| 2017/0195935 | A1* | 7/2017 | Xu ................. | H04W 76/15 |
| 2017/0222876 | A1* | 8/2017 | Van Der Velde ... | H04L 41/0816 |
| 2017/0295524 | A1* | 10/2017 | Malkamaki ....... | H04L 47/34 |
| 2018/0035337 | A1* | 2/2018 | Kitazoe ........... | H04L 69/08 |
| 2018/0199245 | A1* | 7/2018 | Futaki ............. | H04W 72/04 |
| 2018/0255605 | A1* | 9/2018 | Yu ................. | H04W 28/085 |
| 2018/0359800 | A1* | 12/2018 | Wu ................. | H04J 11/0076 |
| 2019/0045568 | A1* | 2/2019 | Palat ............... | H04W 76/27 |
| 2019/0182881 | A1* | 6/2019 | Teyeb .............. | H04W 16/32 |
| 2019/0253937 | A1* | 8/2019 | Hsieh .............. | H04W 36/0061 |
| 2019/0254102 | A1* | 8/2019 | Teyeb .............. | H04W 76/27 |
| 2019/0281645 | A1* | 9/2019 | Van Der Velde ... | H04W 48/18 |
| 2019/0281650 | A1* | 9/2019 | Wu ................. | H04W 76/11 |
| 2019/0357097 | A1* | 11/2019 | Rugeland .......... | H04W 12/041 |
| 2019/0380067 | A1* | 12/2019 | Rosa ............... | H04W 36/0061 |
| 2020/0008256 | A1* | 1/2020 | Wu ................. | H04W 76/27 |
| 2020/0077288 | A1* | 3/2020 | Tsuboi ............. | H04W 24/10 |
| 2020/0077314 | A1* | 3/2020 | Hwang ............. | H04W 36/36 |
| 2020/0120559 | A1* | 4/2020 | Centonza .......... | H04W 80/00 |
| 2020/0154326 | A1* | 5/2020 | Deenoo ............ | H04W 36/08 |
| 2020/0267791 | A1* | 8/2020 | Yilmaz ............. | H04W 76/16 |
| 2020/0389823 | A1* | 12/2020 | Xu ................. | H04W 36/0069 |
| 2021/0211899 | A1* | 7/2021 | Koziol .............. | H04W 24/10 |
| 2021/0219193 | A1* | 7/2021 | Teyeb .............. | H04W 36/0072 |
| 2021/0281552 | A1* | 9/2021 | Van Der Velde ... | H04W 12/041 |

OTHER PUBLICATIONS

Teyeb et al., Full RRC Configuraiton in EN-DC (U.S. Appl. No. 62/587,171), Nov. 16, 2017, USPTO, whole document (Year: 2017).*

Centonza et al., Delta Configuration in Split CU-DU RAN Architecture (U.S. Appl. No. 62/616,912), Jan. 12, 2018, USPTO, whole document (Year: 2018).*

Merriam-Webster, entry for IF, 2025, www.merriam-webster.com/dictionary/if, Merriam-Webster, whole document (Year: 2025).*

Britannica, entry for IF, 2025, www.britannica.com/dictionary/if, Britannica, whole document (Year: 2025).*

Cambridge, entry for IF, 2025, dictionary.cambridge.org/US/dictionary/english/if, Cambridge, whole document (Year: 2025).*

International Search Report issued in Application No. PCT/JP2018/023711, mailed on Jul. 31, 2018 (3 pages).

Written Opinion issued in International Application No. PCT/JP2018/023711, mailed on Jul. 31, 2018 (4 pages).

3GPP TS 38.401 V15.1.0, Release 15; "LTE; 3rd Generation Partnership Project; Technical Specification Group Radio Access Network; NG-RAN; Architecture description;" Mar. 2018; Sophia Antipolis Valbonne, France (23 pages).

3GPP TS 37.340 V15.1.0, Release 15; "3rd Generation Partnership Project; Technical Specification Group Radio Access Network; Evolved Universal Terrestrial Radio Access (E-UTRA) and NR; Multi-connectivity; Stage 2;" Mar. 2018; Sophia Antipolis Valbonne, France (52 pages).

3GPP TSG-RAN WG2 NR Ad hoc 0118; R2-1800148; "Clarification of SCG-ConfigInfo's absence when MN sets full-config flag (RILNo C043);" CATT; Jan. 22-26, 2018; Vancouver, Canada (5 pages).

3GPP TSG-RAN WG2 NR Ad hoc 0118; R2-1800148 "Clarification of SCG-ConfigInfo's absence when MN sets full-config flag (RILNo C043)" CATT; Vancouver, Canada; Jan. 22-26, 2018 (5 pages).

Office Action issued in Japanese Application No. 2020-525180; Dated Jan. 25, 2022 (5 pages).

Decision of Refusal in counterpart Japanese Patent Application No. 2020-525180 issued on Aug. 2, 2022 (5 pages).

Extended European Search Report issued in counterpart European Patent Application No. 18923499.0, mailed on Jan. 10, 2022 (12 pages).

Office Action issued in counterpart European Application No. 18 923 499.0 mailed on Jun. 19, 2023 (5 pages).

Intel Corporation; "Delta/full configuration for bearer type change & SN change"; 3GPP TSG-RAN WG2 Meeting #100, R2-1712666; Reno, Nevada; Nov. 26-Dec. 2, 2017 (5 pages).

Office Action issued in counterpart Chinese Patent Application No. 201880094736.6 issued on Aug. 30, 2023 (16 pages).

HTC; "Full configuration indication for SN Change and Handover"; 3GPP TSG-RAN WG2 NR AH meeting, Tdoc R2-1801351; Vancouver, Canada; Jan. 22-26, 2018 (10 pages).

* cited by examiner

NETWORK NODE

TECHNICAL FIELD

The present invention relates to a network node in a radio communication system.

BACKGROUND ART

In 3GPP (3rd Generation Partnership Project), in order to achieve further increase in a system capacity, further increase a data transmission rate, and further reduction of latency in a radio section, and the like, study on a radio communication scheme referred to as 5G or NR (New Radio) (hereinafter referred to as "5G" or "NR" for the radio communication scheme) has been conducted. In 5G, various radio technologies and network architectures have been studied to meet requirements that latency of a radio section should be reduced to be 1 ms or less while achieving throughput of 10 Gbps or higher (for example, Non-Patent Document 1).

In an NR system, technology referred to as an LTE-NR dual connectivity or a multi RAT (Multi Radio Access Technology) dual connectivity (hereinafter referred to as "MR-DC") has been introduced in which, similarly to dual connectivity in a LTE system, data is divided between a base station (eNB) of the LTE system and a base station (gNB) of the NR system, and the data is transmitted and received simultaneously by these base stations (for example, Non-Patent Document 2).

RELATED ART DOCUMENT

Non-Patent Document

Non-Patent Document 1: 3GPP TS 38.401 V15.1.0 (2018-03)
Non-Patent Document 2: 3GPP TS 37.340 V15.1.0 (2018-03)

SUMMARY OF THE INVENTION

Problem to be Solved by the Invention

In a network architecture of NR, due to mobility of a user device during communication, information relating to a configuration of the user device during communication may be handed over between network nodes. When a network node notifies another network node of the information relating to the configuration of the user device during communication, a notification format of the configuration may not be synchronized. If the notification format of the configuration is not synchronized, the communication could not be continued.

The present invention has been accomplished in view of the above-described point, and an object is that a network node appropriately configures information relating to a configuration of a user device to another network node, and the user device continues the communication.

Means for Solving the Problem

According to the disclosed technique, there is provided a network node that is a first network node of a communication system including a user device and a plurality of network nodes, the first network node including a reception unit that receives an inter-node message relating to a configuration of the user device from a second network node; a determination unit that determines whether a method of updating the configuration of the user device is a full configuration or a delta configuration based on the inter-node message; and an updating unit that updates the configuration of the user device with the full configuration or the delta configuration based on the determination.

Advantage of the Invention

According to the disclosed technique, a network node appropriately configures information related to a configuration of a user device to another network node, and the user device can continue the communication.

EMBODIMENTS OF THE INVENTION

Figure 1:
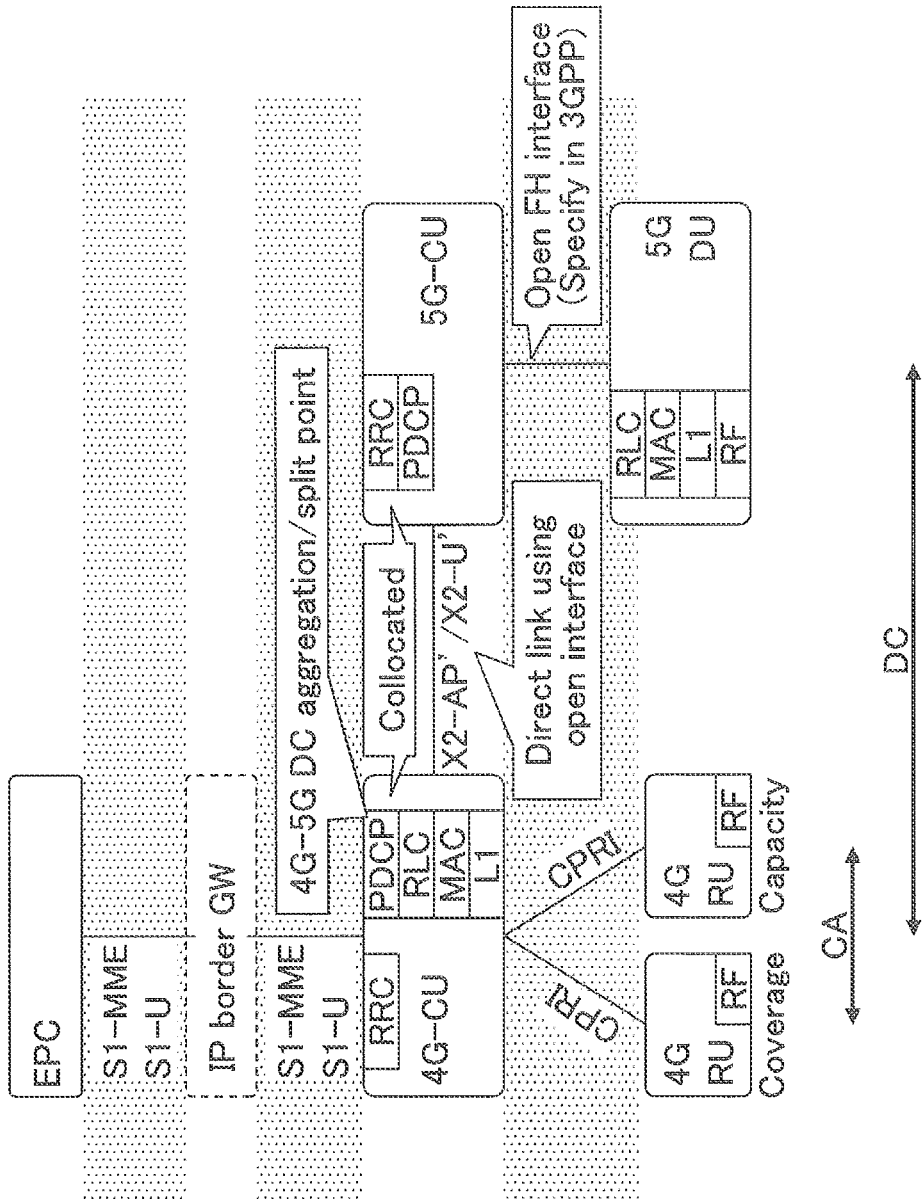
FIG. 1 is a diagram illustrating a configuration example of a network architecture according to an embodiment of the present invention.

In the following, embodiments of the present invention are described with reference to the drawings. It is noted that the embodiments described below are merely an example and embodiments to which the present invention is applied are not limited to the following embodiments.

In an operation of a radio communication system according to an embodiment of the present invention, an existing technology is appropriately used. However, the existing technology is, for example, an existing LTE, but it is not limited to the existing LTE. In addition, the term "LTE" used in this specification shall have a broad meaning including LTE-Advanced and later schemes of LTE-Advanced (e.g., NR or 5G) unless otherwise specified.

In addition, in the embodiment of the present invention described below, Ss (Synchronization Signal), PSS (Primary SS), SSS (Secondary SS), PBCH (Physical broadcast Channel), PRACH (Physical RACH), DL (Downlink), UL (Uplink), and the like are used. This is for the sake of convenience of description. Signals, functions, and the like similar to these may be referred to by other names.

In addition, in the embodiment of the present invention, a duplex scheme may be a TDD (Time Division Duplex) scheme, an FDD (Frequency Division Duplex) scheme, or other schemes (e.g., Flexible Duplex).

In the following description, a method of transmitting a signal using a transmission beam may be digital beam forming for transmitting a signal multiplied by a precoding vector (precoded with the precoding vector), or may be analog beamforming that realizes beam forming by using a variable phase shifter in an RF (Radio Frequency) circuit. Similarly, a method of receiving a signal using a reception beam may be digital beam forming for multiplying a received signal by a predetermined weight vector, or may be analog beam forming that realizes beam forming using a variable phase shifter in the RF circuit. Hybrid beam forming combining the digital beam forming and the analog beam forming may be applied. In addition, transmitting a signal using the transmission beam may be to transmit a signal at a particular antenna port. Similarly, receiving a signal with a reception beam may be to receive a signal at a particular antenna port. The antenna port refers to a logical antenna port or a physical antenna port defined in the 3GPP standard.

It is noted that the method of forming the transmission beam and the reception beam is not limited to the above-described method. For example, in a base station apparatus or a user apparatus having a plurality of antennas, a method of changing an angle of each antenna may be used, a method of using a combination of a method using a precoding vector and the method of changing the angle of the antenna may be used, different antenna panels may be switched and used, a method of combining and using a plurality of antenna panels may be used, or another method may be used. Furthermore, for example, in a high frequency band, a plurality of mutually different transmission beams may be used. Using multiple transmission beams is referred to as multi-beam operation, and using one transmission beam is referred to as single beam operation.

Furthermore, in the embodiment of the present invention, a radio parameter or the like being "configured" may be that a predetermined value is pre-configured or defined, or may be that the radio parameter notified from a base station device or a user device is configured.

FIG. 1 is a diagram illustrating a configuration example of a network architecture in an embodiment of the present invention. As illustrated in FIG. 1, the radio network architecture in an embodiment of the present invention includes a 4G-CU, a 4G-RU (Remote Unit, Remote Radio Station), a EPC (Evolved Packet Core), and the like on a LTE-Advanced side. The radio network architecture according to the embodiment of the present invention includes a 5G-CU, a 5G-DU and the like on a 5G side.

As illustrated in FIG. 1, the 4G-CU includes layers of RRC (Radio Resource Control), PDCP (packet data convergence protocol), RLC (radio link control), MAC (medium access control) and a L1 (Layer 1, PHY layer or Physical layer), and is connected to the 4G-RU via a CPRI (Common Public Radio Interface). A network node including the 4G-CU and the 4G-RU is referred to as an eNB.

On the 5G side, as illustrated in FIG. 1, the 5G-CU includes a RRC layer and is connected to the 5G-DU via a FH (Fronthaul) interface. In addition, the 5G-CU is connected to the 4G-CU via an X2 interface. The PDCP layer in the 4G-CU serves as an aggregation or split point when performing 4G-5G DC (Dual Connectivity), that is, EN-DC (E-UTRA-NR Dual Connectivity). A network node including the 5G-CU and the 5G-DU is referred to as a gNB. In addition, the 5G-CU may be referred to as a gNB-CU and the 5G-DU may be referred to as a gNB-DU.

In addition, as illustrated in FIG. 1, CA (Carrier Aggregation) is performed between the 4G-RUs, and DC is performed between the 4G-RU and the 5G-DU. Although not illustrated, a UE (User Equipment) 300 is wirelessly connected via RF of the 4G-RU or the 5G-DU to transmit and receive packets.

It is noted that FIG. 1 illustrates a radio network architecture at the time of LTE-NR DC. However, the same radio network architecture may be used when splitting the 4G-CU into CU-DU or operating NR stand-alone. In case of splitting the 4G-CU into CU-DU, functions relating to the RRC layer and the PDCP layer may be transferred to the 4G-CU and the RLC layer and below may be included in the 4G-DU. It should be noted that a data rate of CPRI may be reduced by the CU-DU split. Further, a plurality of 5G-DUs may be connected to the 5G-CU.

Figure 2:
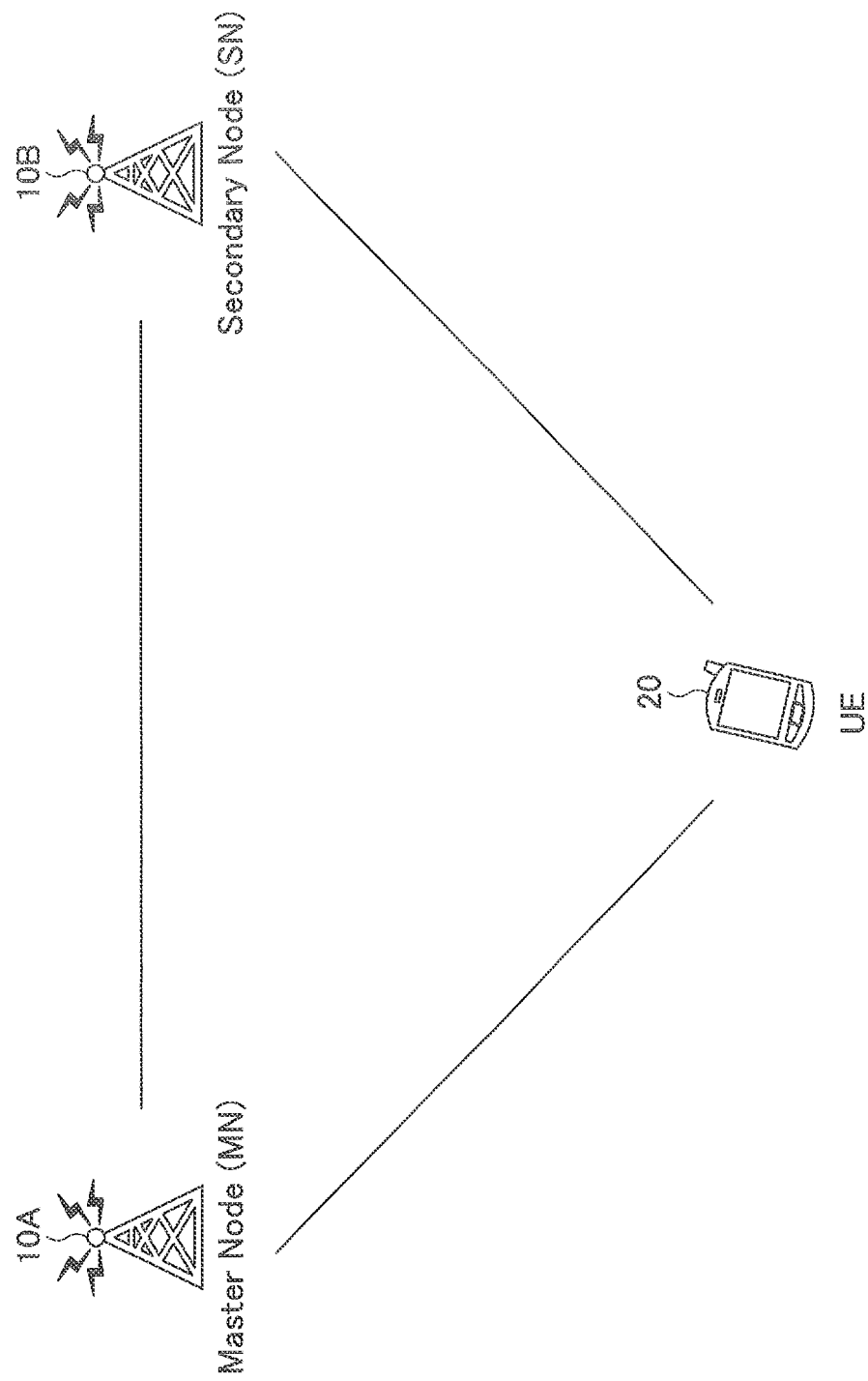
FIG. 2 is a diagram illustrating a configuration example of a communication system according to an embodiment of the present invention.

FIG. 2 is a diagram illustrating a configuration example of a radio communication system according to an embodiment of the present invention. FIG. 2 is a schematic diagram illustrating a wireless communication system at the time of EN-DC.

As illustrated in FIG. 2, a user device 20 communicates with a base station device 10A provided by an LTE system, and a base station device 10B provided by a NR system (hereinafter, if the base station device 10A and the base station device 10B are not distinguished, they may be referred to as a "base station device 10"). Furthermore, the user device 20 supports LTE-NR dual connectivity, i.e., EN-DC in which the base station device 10A is regarded as a master node (hereinafter also referred to as a "MN") and the base station device 10B is regarded as a secondary node (hereinafter also referred to as a "SN"). The user device 20 can simultaneously use a plurality of component carriers provided by the base station device 10A of the master node and the base station device 10B of the secondary node to perform simultaneous transmission or simultaneous reception with the base station device 10A of the master node and the base station device 10B of the secondary node. It is noted that in the illustrated example, each of the LTE system and the NR system has only one base station. However, in general, a large number of base station devices 10 are arranged to cover the service areas of the LTE system and the NR system.

It is noted that although the following examples are described with respect to the LTE-NR dual connectivity, the user device 20 according to the embodiment of the present invention is not limited to be applied to the LTE-NR dual connectivity, but can be a dual connectivity between a plurality of radio communication systems utilizing different RATs, i.e., MR-DC (Multi-RAT Dual Connectivity).

With respect to various configurations configured to the user device 20 during communication, information configured to the user device 20 such as a radio bearer or a secondary cell (SCell) configuration may change depending on communication condition or the like. The network can continue stable communication by changing to an appropriate configuration for the user device 20 accordingly. The configuration indicates information for performing communication configured to the user device 20.

In case of changing the configuration values in the user device 20 or the network node, a delta configuration is known in which only the difference from the configuration value configured in the previous time is notified. If the delta configuration is available from the viewpoint of radio resource consumption or terminal power consumption, it is desirable to apply the delta configuration. The various configurations already configured to the user device 20 can be handed over between the network nodes. For example, it is conceivable to continue the delta configuration at the time of straddling the network nodes due to mobility.

In case of changing the configuration values, a full configuration is known in which all the configuration values are notified. For example, if there is no compatibility between network nodes, the full configuration is applied.

Here, if a target node cannot understand the previous configuration values, the delta configuration cannot be applied. Since an (RRC) interface between the network nodes is allowed to be extended, situations may occur in which the previous configuration cannot be understood at the time of hopping on the network nodes having different available versions or functions.

Accordingly, in order to continue communication while initializing the configured configuration, the full configuration is executed. The full configuration is embodied by the network notifying the user device 20 of a reconfiguration newly configured together with an initialization instruction. Further, in accordance with the initialization of the user device 20, it is necessary to initialize associated variables also in the network node. Compared to the delta configuration, the full configuration has many disadvantages, such as resource consumption, and the like; therefore, the full configuration is executed as an alternative means when the delta configuration is unable to be executed.

In the full configuration, release and addition of a DRB (Data radio bearer) can be executed at one time. The DRB is released in the initialization process, and the addition of the DRB is executed in the process of reconfiguring the configuration. For release and addition of the same DRB-ID, there is a restriction in the specification such that the same DRB-ID is unable to be configured for a drb-ToReleaseList and a drb-ToAddModList in a same RB configuration. Thus, the release and addition of the DRB are executed through changing the DRB-ID. If maintaining the DRB-ID, the full configuration is executed and the release and addition of the DRB are executed at once. In the EN-DC, two RB configurations (nr-RadioBearerConfig1/nr-RadioBearerConfig2) can be configured for RBs of the NR side PDCP (Packet Data Convergence Protocol), so that, if the release is configured to one side and the addition is configured to the other side, the release and addition of the DRB can be executed at one time.

Figure 3:
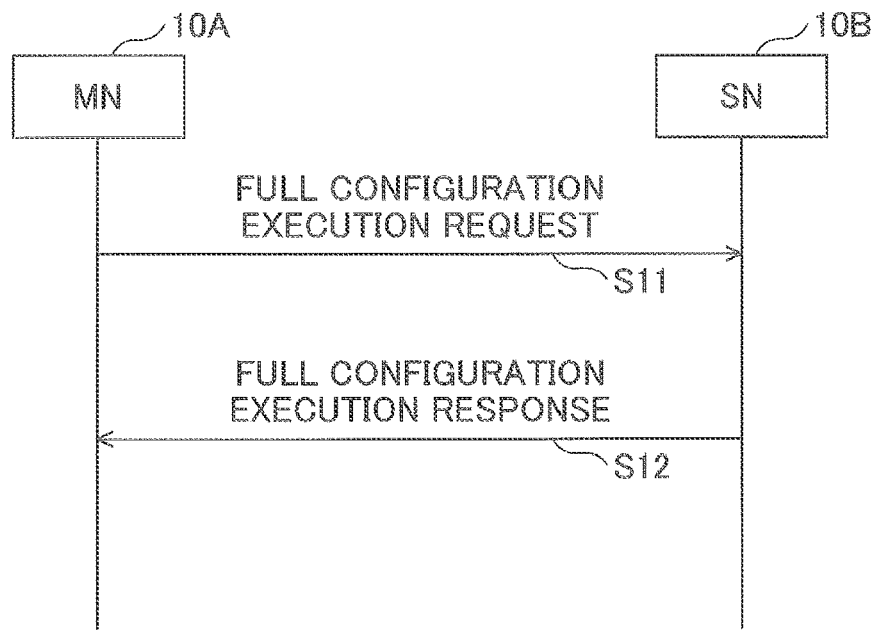
FIG. 3 is a diagram illustrating an example (1) of a configuration between network nodes.

FIG. 3 is a diagram illustrating an example (1) of a configuration between network nodes. In the EN-DC, use cases in which the full configuration is executed include the following cases, for example. Cases where there is no compatibility between the network nodes correspond to A) and B), and cases where the release and addition of the DRB are executed correspond to C) and D).

A) Case of the target MN to fail to interpret the configuration value of the source MN
B) Case of the target SN to fail to interpret the configuration value of the source SN
C) Case of changing a PDCP version of the DRB
D) Case of avoiding a PDCP count wrap around of the DRB The full configuration during the EN-DC is embodied by the MN reconfiguring a configuration to be newly configured in addition to the initialization instruction. As illustrated in FIG. 3, the MN 10A transmits a full configuration execution request to the SN 10B (S11), the full configuration is executed, and the SN 10B transmits a full configuration execution response to the MN 10A (S12). Unlike the full configuration in a condition not during the EN-DC, if continuing the EN-DC, it is necessary to reconfigure both of the MN and SN configurations. The initialization instruction and the configuration on the network side can be configured to be closed to the MN only. In contrast, the configuration on the SN side needs to be acquired from the SN.

As a method for the MN to acquire the configuration on the SN side, there is a method of acquiring the full configuration execution response from the SN 10B which is a response of the full configuration execution request from the MN 10A illustrated in FIG. 3. It is a method of embodying the full configuration triggered by the MN and corresponds to A), C), and D) of the above use cases.

Figure 4:
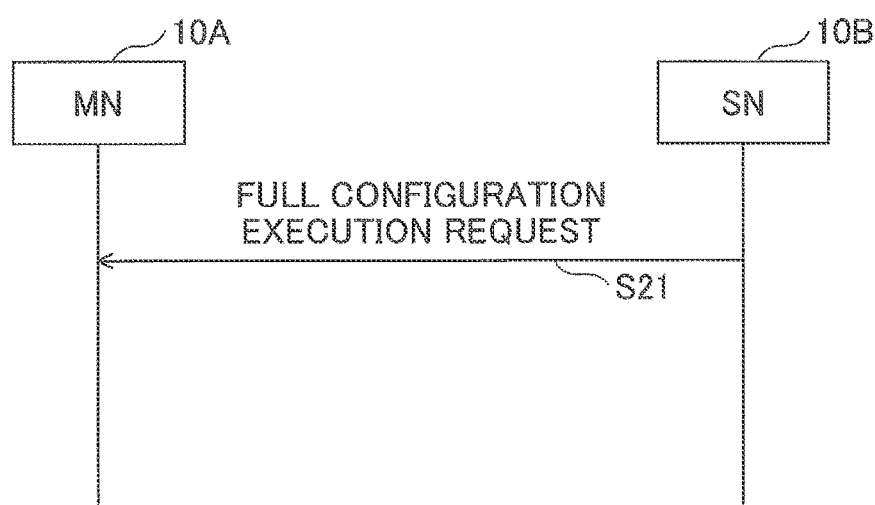
FIG. 4 is a diagram illustrating an example (2) of a configuration between network nodes.

FIG. 4 is a diagram illustrating an example (2) of a configuration between network nodes. As a method of the MN to acquire the configuration on the SN side, there is a method of acquiring the full configuration execution request transmitted from the SN 10B to the MN 10A illustrated in FIG. 4 (S21). It is a method of embodying the full configuration triggered by the SN and corresponds to B) of the above use cases.

Table 1 illustrates X2 messages transmitted and received between the network nodes used in the above use cases A), B), C) and D).

TABLE 1

| Procedure | Execution Request/ Execution Response | Use Case |
|---|---|---|
| SN Addition | SgNB Addition Request/ SgNB Addition Request Ack | C |
| MN initiated SN Modification | SgNB Modification Request/ SgNB Modification Reqeust Ack | C or D |
| MN/SN initiated SN Change | SgNB Addition Request Ack | B |
| Inter-MN HO w/SN Change | SgNB Addition Request/SgNB Addition Request Ack SgNB Addition Request Ack | A or A + B B |
| Inter-MN HO w/o SN Change | SgNB Addition Request/ SgNB Addition Request Ack | A |

In Table 1, the X2 message of the "execution request/ execution response" used in the "Procedure" is transmitted and received between the network nodes. The "Procedure" includes a "SN Addition" for adding the SN, a "MN initiated SN Modification" for modifying the configuration of the SN, a "MN/SN initiated SN Change" for changing the SN, an "Inter-MN HO w/SN Change" for performing hand over of the MN with the SN change, and an "Inter-MN HO w/o SN Change" for performing hand over of the MN without the SN change. The X2 message of the "execution request or execution response" used in each "Procedure" includes a "SgNB Addition Request" for adding the SN and its response "SgNB Addition Request Ack", and a "SgNB Modification Request" for modifying the configuration of the SN and its response "SgNB Modification Request Ack".

In each "Procedure" illustrated in Table 1, the above use cases occur. In a case of the "SN Addition", the use case C occurs. In a case of the "MN initiated SN Modification", the use case C or D occurs. In a case of the "MN/SN initiated SN Change", the use case B occurs. In a case of the "Inter-MN HO w/SN Change", the use case A occurs, the use cases A and B occur simultaneously, or the use case B occurs. In a case of the "Inter-MN HO w/o SN Change", the use case A occurs.

That is, in the full configuration execution request triggered by the MN, the "SgNB Addition Request" and the "SgNB Modification Request" cover all of the use cases. In addition, in the full configuration execution request triggered by the SN, the "SgNB Addition Request Ack" covers all of the use cases.

The full configuration execution request triggered by the MN can be made based on a presence/absence of a configuration of a specific IE (information element) included in "CG-ConfigInfo" being an inter-node message configurable to the "SgNB Addition Request" or the "SgNB Modification Request". Table 2 is a table for illustrating the specific IE.

TABLE 2 sourceConfigSCG
Includes the current dedicated SCG
configuration in the same format as the
RRCReconfiguration message, i.e. not only
CellGroupConfig but also e.g. measConfig.
This field is absent when master eNB uses
full configuration option.
scg-RB-Config
Contains the IE RadioBearerConfig of the SN,
used to support delta configuration e.g. during
SN change. This field is absent when master
eNB uses full configuration option.

The IE "sourceConfigSCG" illustrated in Table 2 is an IE for configuring a SCG (Secondary Cell Group), and if the MN performs the full configuration, the IE is not configured (Absent). In addition, the IE "scg-RB-Config" illustrated in Table 2 is an IE for performing a delta configuration of a SCG radio bearer, and if the MN performs the full configuration, the IE is not configured.

The full configuration execution request triggered by the SN can be made with a configuration value of a specific IE included in a "RRC config indication" which is an inter-node message configurable to the "SgNB Addition Request Ack" or the "SgNB Modification Request Ack". Table 3 is a table for illustrating the specific IE.

able to the "SgNB Addition Request" or the "SgNB Modification Request". Table 4 is a table for illustrating the specific IE.

TABLE 4 scg-CellGroupConfig
Contains the RRCReconfiguration message,
used to (re-)configure the SCG configuration
upon SCG establishment or modification, as
generated (entirely) by the (target) SgNB
scg-RB-Config
Contains the IE RadioBearerConfig, used to
establish or reconfigure the SCG configuration,
used to (re-)configure the SCG RB configuration
upon SCG establishment or modification, as
generated (entirely) by the (target) GNB The IE "scg-CellGroupConfig" illustrated in Table 4 is an IE for configuring the SCG, and it is possible to configure the configuration. The IE "scg-RB-Config" illustrated in Table 4 is an IE that performs the delta-configuration of the radio bearer of the SCG, and can configure the configuration.

Figure 5:
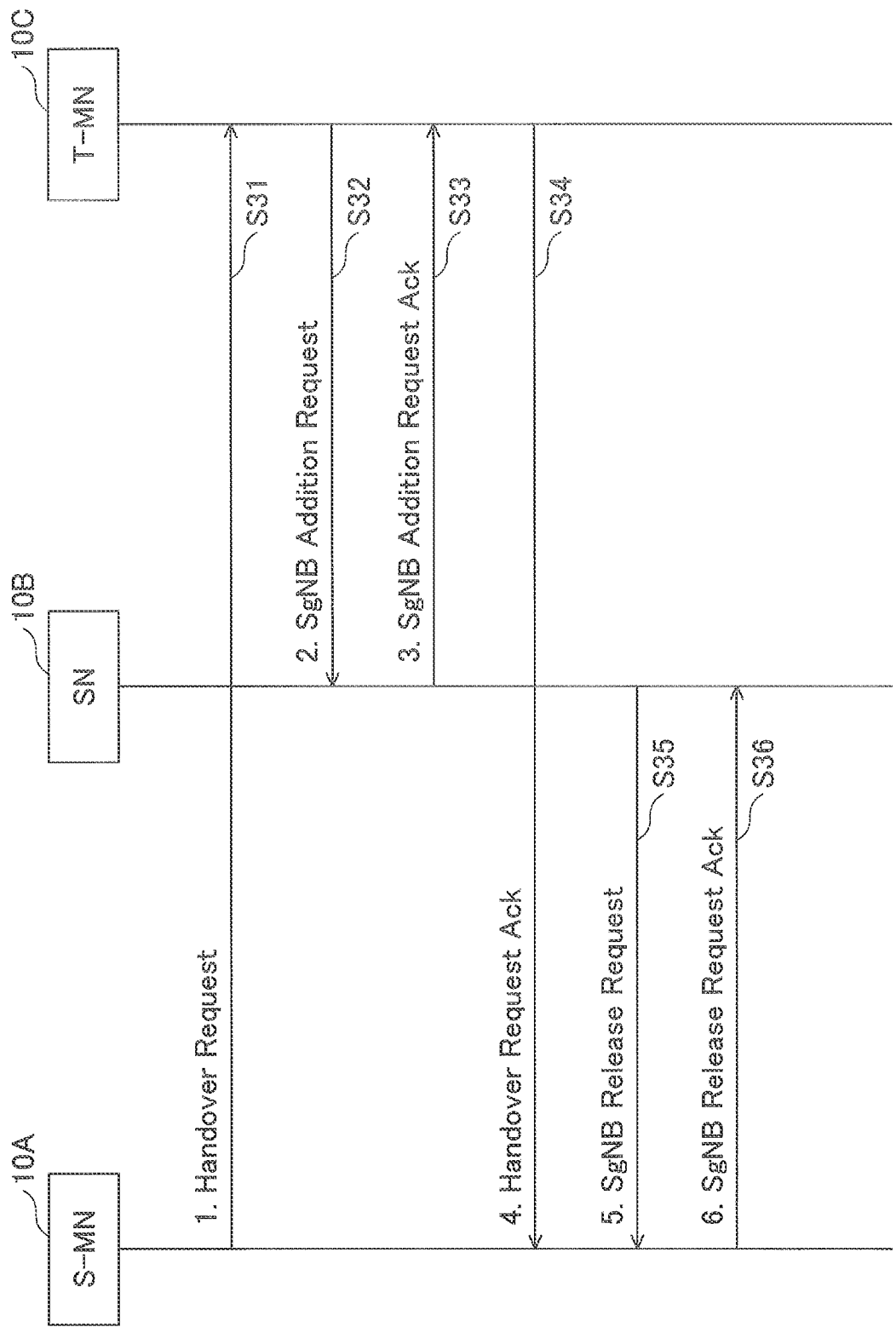
FIG. 5 is a diagram illustrating an example (3) of a configuration between network nodes.

FIG. 5 is a diagram illustrating an example (3) of a configuration between network nodes. FIG. 5 is an example of a sequence for executing a procedure "Inter-MN HO w/o SN change". In this sequence, the SN is not changed.

In step S31, a S-MN 10A serving as a source MN transmits a "Handover Request" to a T-MN 10C as a target MN. Subsequently, the T-MN 10C transmits a "SgNB Addition Request" to a SN 10B (S32). In step S32, the SN specifies a UEContext with an identifier SgNB-UE-X2AP-ID, and performs the delta configuration.

In step S33, the SN 10B transmits a "SgNB Addition Request Ack" to the T-MN 10C. Subsequently, the T-MN 10C transmits a "Handover Request Ack" to the S-MN 10A (S34). Subsequently, the SN 10B transmits a "SgNB Release Request" to the S-MN 10A (S35). Subsequently, the S-MN 10A transmits a "SgNB Release Request Ack" to the SN 10B (S36).

Here, in a case of executing the full configuration execution request triggered by the MN, it is only possible to apply a method of causing an IE for continuing the delta configuration to be not configured if the target node changes. Since the SN is not changed in the sequence illustrated in FIG. 5, when the SN receives an inter-node message at step S32, it is unclear how the SN identifies whether it is full configuration or delta configuration. If the MN does not expect the full configuration, the MN is required to always configure the associated IE in the inter-node message.

Figure 6:
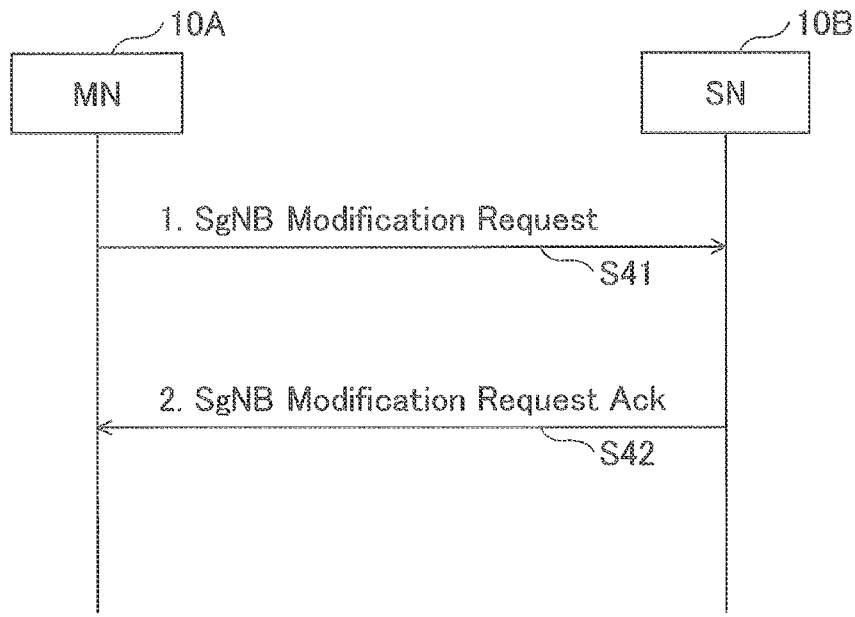
FIG. 6 is a diagram illustrating an example (4) of a configuration between network nodes.

FIG. 6 is a diagram illustrating an example (4) of a configuration between network nodes. FIG. 6 is an example

TABLE 3

| IE/Group Name | Presence | Range | IE type and reference | Semantics description | Criticality | Assigned Criticality |
|---|---|---|---|---|---|---|
| RRC config indication | O | | ENUMERATED (full config, delta config, . . . ) | Indicates the type of RRC configuration used at the en-gNB. | YES | reject |

In the IE "RRC config indication" illustrated in Table 3, a "full config" can be configured as the configuration value.

The full configuration execution response can be made by configuring a configuration to a specific IE included in the "CG-ConfigInfo" which is an inter-node message configurof a sequence for executing a procedure "MN initiated SN modification". In this sequence, the SN is not changed.

In step S41, the MN 10A transmits a "SgNB Modification Request" to the SN 10B. In step S21, the SN specifies a UEContext with an identifier SgNB-UE-X2AP-ID and performs the delta configuration. Subsequently, the SN 10B transmits a "SgNB Modification Request Ack" to the MN 10A.

Here, similar to FIG. 5, in a case of executing a full configuration execution request triggered by the MN, it is only possible to apply a method of causing an IE for continuing the delta configuration to be not configured if the target node changes. Since the SN is not changed in the sequence illustrated in FIG. 6, when the SN receives the inter-node message in step S21, it is unclear how the SN identifies whether it is full configuration or delta configuration. If the MN does not expect full configuration, the MN is required to always configure the associated IE in the inter-node message.

Figure 7:
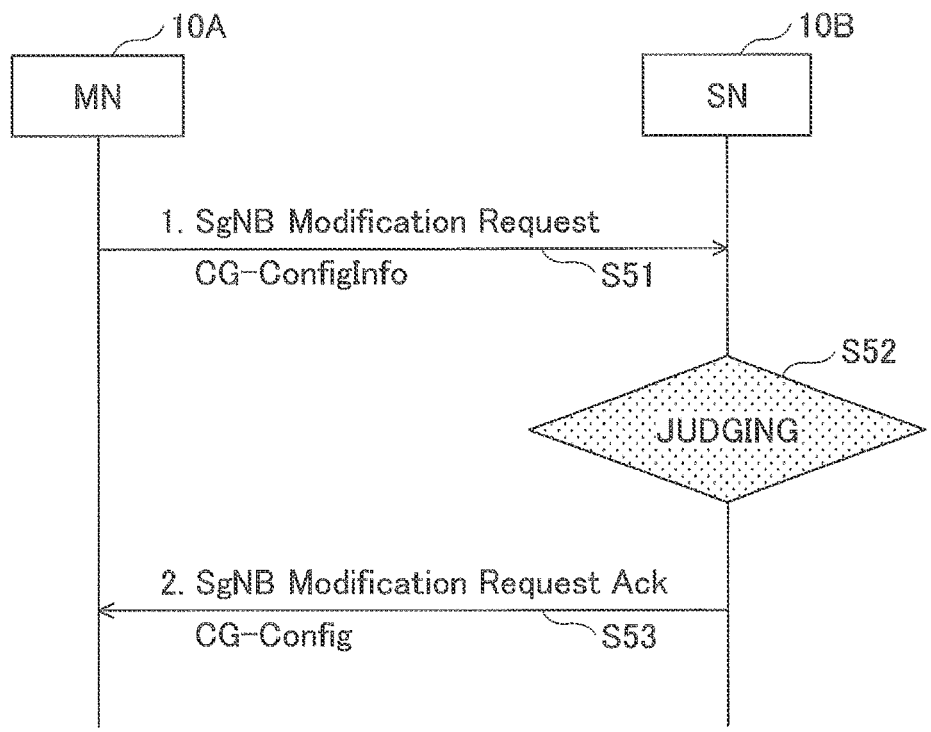
FIG. 7 is a diagram illustrating an example (5) of a configuration between network nodes.

FIG. 7 is a diagram illustrating an example (5) of a configuration between network nodes. As illustrated in FIGS. 5 and 6, if the MN does not expect full configuration, it is necessary to always configure the associated IE in the inter-node message. FIG. 7 illustrates an example of a sequence in which the MN configures the configuration to the SN.

In step S51, the MN 10A transmits a "SgNB Modification Request" including CG-ConfigInfo to the SN 10B. Subsequently, the SN refers to an associated IE included in the CG-ConfigInfo and performs determination (S52). Subsequently, the SN 10B transmits a "SgNB Modification Request Ack" including a CG-Config to the MN 10A (S53). Table 5 is a table for illustrating the determination process in step S52.

TABLE 5

| Associated IE Configuration | Expected Operation of MN | Determination Result of SN |
|---|---|---|
| Absent | Full Config | Full Config |
| Absent | Delta Config | Full Config |
| Present | Delta Config | Delta Config |

As illustrated in Table 5, if the associated IE configuration is "Present", the expected operation of the MN and the determination result of the SN are both delta configuration and there is no problem. If the associated IE configuration is "Absent", the determination result of the SN is full configuration. However, the expected operation of the MN may be a full configuration or delta configuration. Consequently, inconsistency may occur between the expected operation of the MN and the determination result of the SN. Accordingly, in order to eliminate the inconsistency between the expected operation of the MN and the determination result of the SN, it is necessary to add information indicating the presence/absence of the execution request of the full configuration to the inter-node message.

Figure 8:
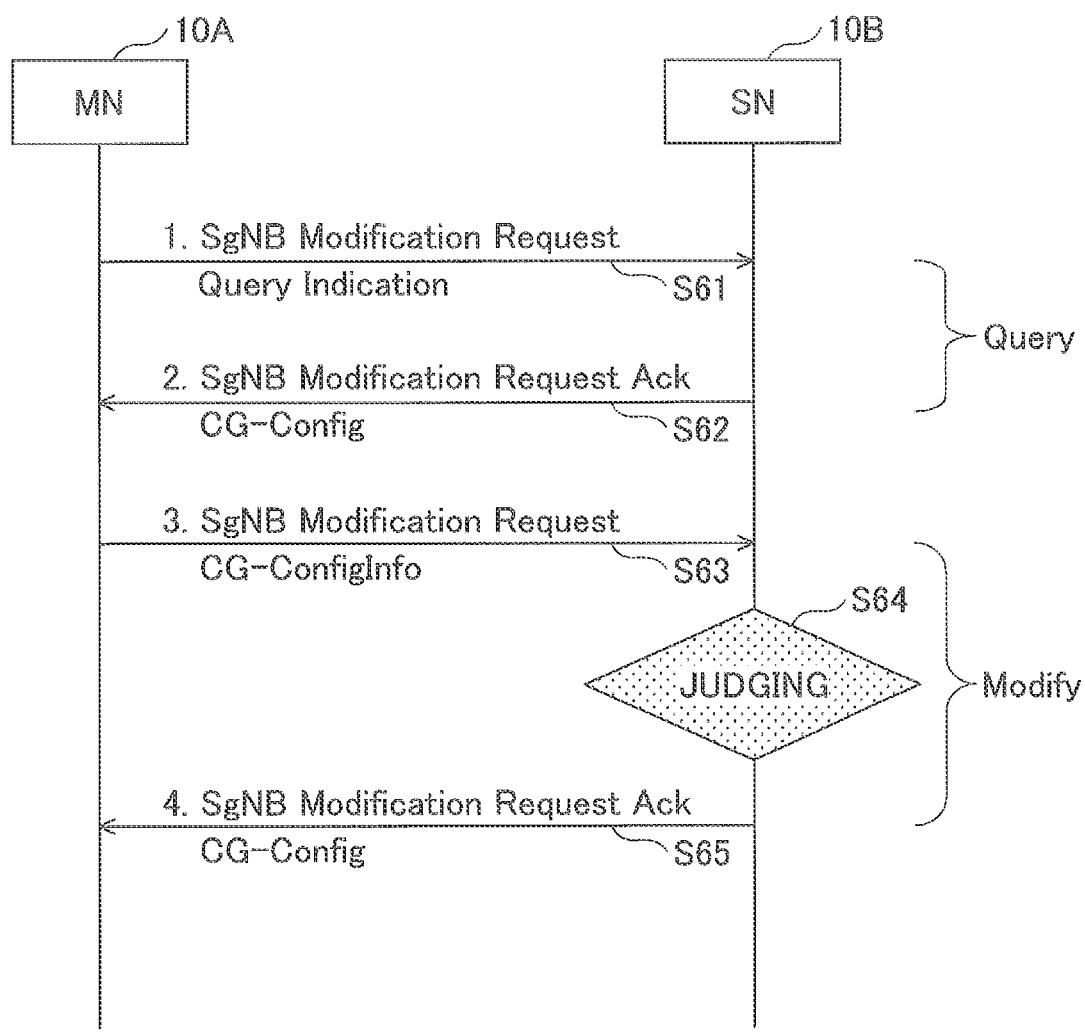
FIG. 8 is a diagram illustrating an example (6) of a configuration between network nodes.

FIG. 8 is a diagram illustrating an example (6) of a configuration between network nodes. Since a specific IE configured in the inter-node message if the MN does not expect full configuration is for delta configuration use, if the SN overwrites the configuration notified from the MN, the MN is required to acquire the latest configuration from the SN. In order for the MN to acquire the configuration currently configured from the SN, there is a method of configuring a "Query Indication" to the "SgNB Modification Request". FIG. 8 illustrates an example of a sequence for configuring a configuration after the MN acquired the configuration currently configured from the SN.

In step S61, the MN 10A transmits a "SgNB Modification Request" including a Query Indication to the SN 10B. Subsequently, the SN 10B transmits a "SgNB Modification Request Ack" including a CG-Config to the MN 10A, and the MN 10A acquires the latest configuration. Steps S61 and S62 are "Query" procedures. The "Query" procedure can be signaling overhead. According to the "Query" procedure after the MN acquires the latest configuration from the SN, the MN transmits the configuration to the same SN, and thus, the sequence of FIG. 8 includes a redundant procedure.

Steps S63 to S65 are a "Modify" procedure, which is the same as steps S51 to S53. That is, since the determination illustrated in Table 5 is performed in the same way, regarding the full configuration and the delta configuration, inconsistency between the expected operation of the MN and the determination result of the SN may occur. Accordingly, in order to eliminate the inconsistency between the expected operation of the MN and the determination result of the SN, it is necessary to add information indicating the presence/absence of the execution request of the full configuration to the inter-node message.

Figure 9:
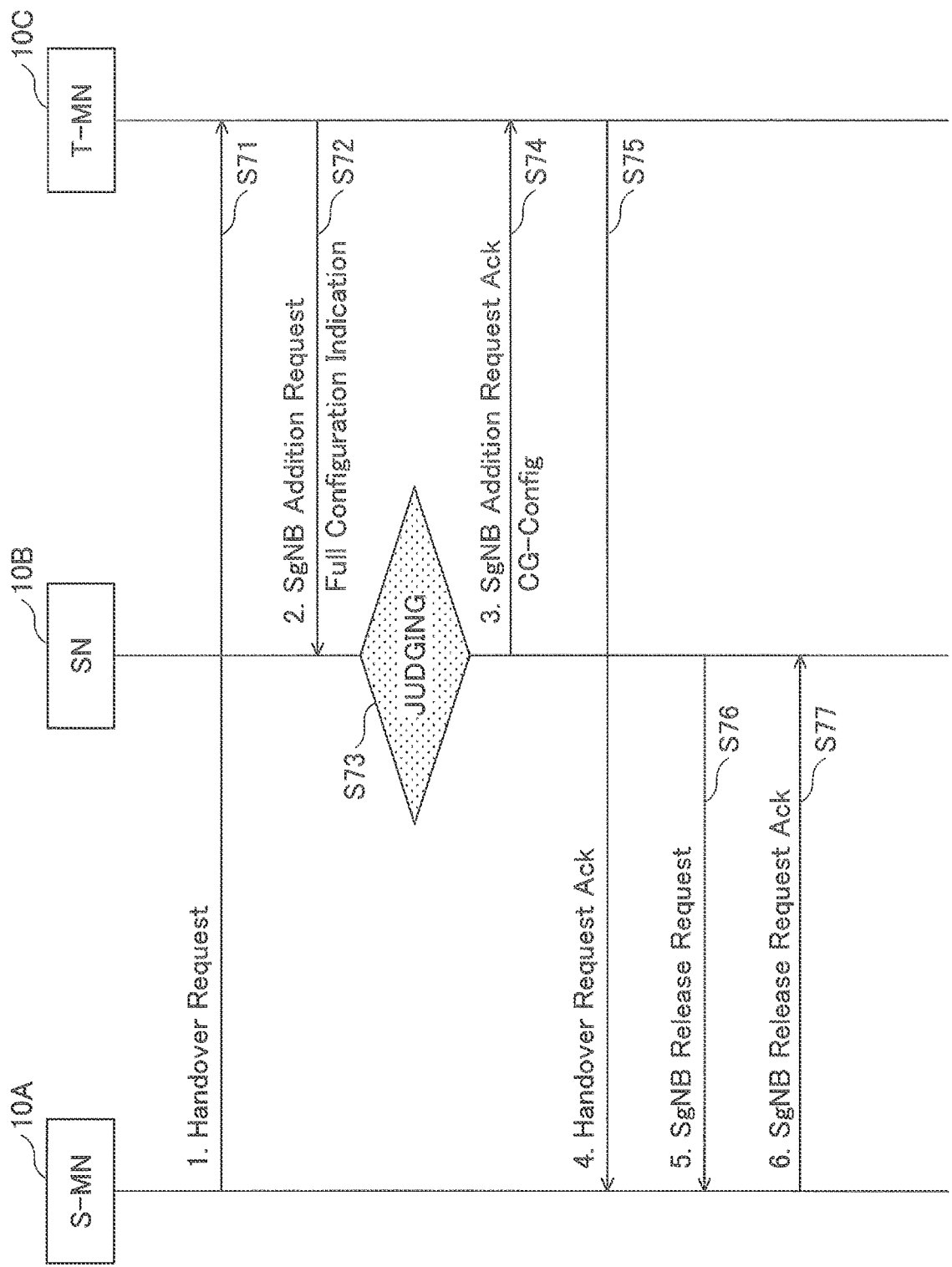
FIG. 9 is a diagram illustrating an example (1) of a configuration between network nodes according to an embodiment of the present invention.

FIG. 9 is a diagram illustrating an example (1) of a configuration between network nodes according to an embodiment of the present invention. As described with reference to FIGS. 7 and 8, regarding the full configuration and the delta configuration, inconsistency between the expected operation of the MN and the determination result of the SN may occur. Therefore, an Indication (notification) indicating the presence/absence of execution request of the full configuration is added to the inter-node message "SgNB Addition Request".

FIG. 9 illustrates an example of a sequence for executing a procedure "Inter-MN HO w/o SN change". In step S71, the S-MN 10A serving as the source MN transmits a "Handover Request" to the T-MN 10C as the target MN. Subsequently, the T-MN 10C transmits a "SgNB Addition Request" including an Indication indicating the presence/absence of execution of the full configuration to the SN 10B (S72).

In step S73, the SN refers to an associated IE included in the CG-ConfigInfo and the Indication indicating the presence/absence of the execution request of the full configuration, and determines whether the inter-node message request is the full configuration or the delta configuration. Table 6 is a table for illustrating the determination process in step S73.

TABLE 6

| Associated IE Configuration | Indication | Expected Operation of MN | Determination Result of SN |
|---|---|---|---|
| Absent | Present | Full Config | Full Config |
| Absent | Absent | Delta Config | Delta Config |
| Present | Absent | Delta Config | Delta Config |

As illustrated in Table 6, if the associated IE configuration is "Present", the expected operation of MN and the determination result of SN are both delta configuration. If the associated IE configuration is "Absent" and the Indication is "Present", the determination result of the SN is the full configuration, and the expected operation of the MN is full configuration, so the expected operation of the MN and the determination result of the SN are identical. If the associated IE configuration is "Absent" and the Indication is "Absent", since the determination result of the SN is the delta configuration and the expected operation of the MN is the delta configuration, the expected operation of the MN and the determination result of the SN are identical.

Accordingly, in any case, it is possible to correctly determine the full configuration execution request transmitted from the MN by the SN, and to execute the full configuration. Thus, it is possible to reduce unnecessary signaling such as a "Query" procedure.

In step S74, the SN 10B transmits a "SgNB Addition Request Ack" to the T-MN 10C. Subsequently, the T-MN 10C transmits a "Handover Request Ack" to the S-MN 10A (S75). Subsequently, the SN 10B transmits a "SgNB Release Request" to the S-MN 10A (S76). Subsequently, the S-MN 10A transmits a "SgNB Release Request Ack" to the SN10B (S77).

Figure 10:
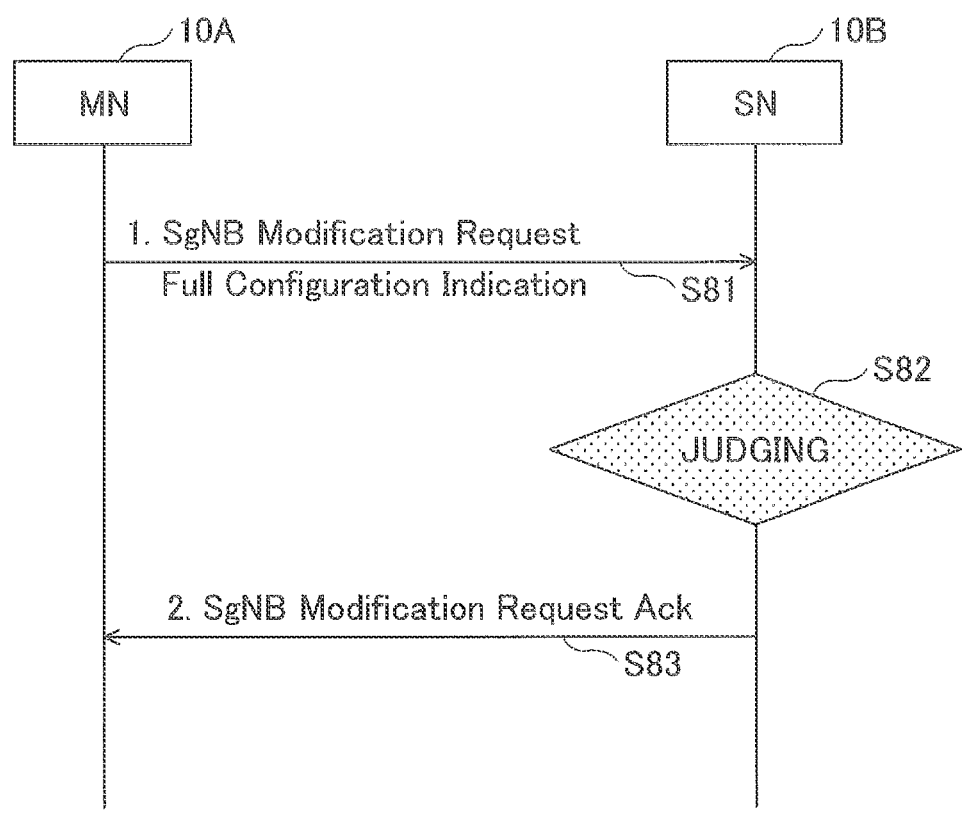
FIG. 10 is a diagram illustrating an example (2) of a configuration between network nodes according to an embodiment of the present invention.

FIG. 10 is a diagram illustrating an example (2) of a configuration between network nodes in the embodiment of the present invention. FIG. 10 illustrates an example of adding a notification (Indication) indicating the presence/absence of the full configuration to the inter-node message "SgNB Modification Request".

In step S81, the MN 10A transmits the "SgNB Modification Request" including the Indication indicating the presence/absence of the execution request of the full configuration to the SN 10B. Subsequently, the SN refers to an associated IE included in the CG-ConfigInfo and the Indication indicating the presence/absence of the execution request of the full configuration (S82). Subsequently, the SN 10B transmits a "SgNB Modification Request Ack" including a CG-Config to the MN 10A (S83). Since the determination illustrated in Table 6 is performed in Step S82 in the same manner as in Step S73, in any case, the full configuration execution request transmitted from the MN is correctly determined by the SN and the full configuration can be executed. Thus, it is possible to reduce unnecessary signaling such as the "Query" procedure.

Figure 11:
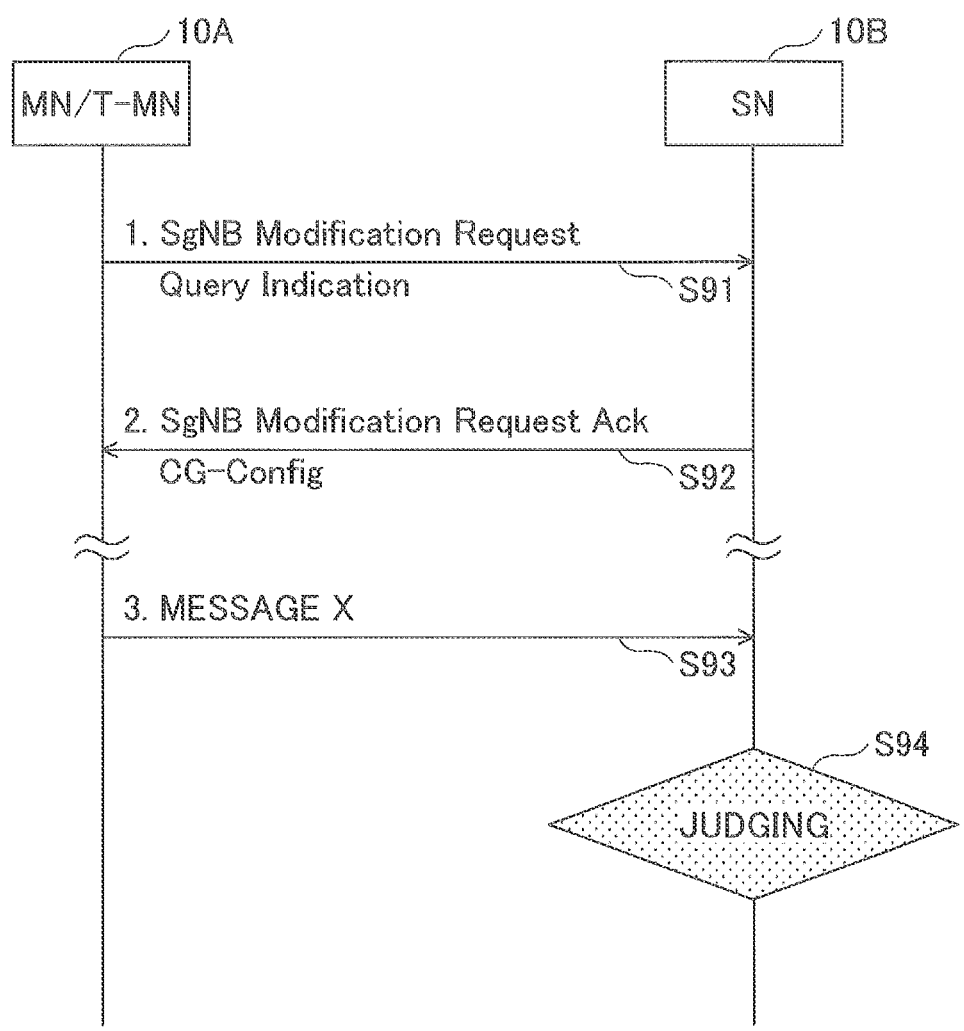
FIG. 11 is a diagram illustrating an example (3) of a configuration between network nodes according to an embodiment of the present invention.

FIG. 11 is a diagram illustrating an example (3) of a configuration between network nodes in the embodiment of the present invention. An example of full configuration using "Query Indication" is illustrated in FIG. 11.

The "Query Indication" is a notification for the MN to acquire the latest configuration from the source SN. Namely, it is a mechanism for the MN to continue the delta configuration with the target SN. The "Query Indication" is defined only in the inter-node message "SgNB Modification Request." Since the configuration acquired by the "Query Indication" is for delta configuration use, there is a difference from the configuration for full configuration use. With respect to this difference, configuration values of which changes necessarily occur when a node is changed are unnecessary. In the "Query Indication", the SN only notifies the configuration, and various variables on the SN side are not initialized. As the operation of the SN after the "Query Indication", because a case of continuing the delta configuration and a case of executing the full configuration both exist, an operation of always executing either one of the cases is not possible.

In step S91, the MN 10A or the T-MN 10A transmits a "SgNB Modification Request" including a "Query Indication" to the SN 10B. Subsequently, the SN 10B transmits a "SgNB Modification Request Ack" including a CG-Config to the MN 10A or the T-MN 10A (S92). In step S92, the MN 10A or the T-MN 10A acquires the configuration for full configuration using the "Query Indication".

In step S93, the MN 10A or the T-MN 10A transmits a message X to the SN 10B. Subsequently, the SN determines a process type based on the message X (S94). The message X has the same ID as the identifier SgNB-UE-X2AP-ID used in step S92. Table 7 is a table for illustrating the determination process in step S73.

TABLE 7

| Received Message | Determination Result of SN |
| --- | --- |
| SgNB Reconfiguration Complete | Full Config Execution Request (Execute Initialization Process) |
| Others (SgNB Addition Request/SgNB Modification Request/SgNB Release Request) | Normal Query (Execute Nothing) |

The "Received message" illustrated in Table 7 is the message X received by the SN 10B in step S93. Only when the "received message" is "SgNB Reconfiguration Complete", the SN 10B determines that it is a full configuration execution request and carries out an initialization process. In case of other messages, that is, the "SgNB Addition Request", the "SgNB Modification Request" or the "SgNB Release Request", it is determined that it is a normal Query and the initialization process is not performed.

It should be noted that "Query Indication" may be included in the message "SgNB Addition Request". If the "Query Indication" is included in the message "SgNB Addition Request", an Indication indicating the presence/absence of the full configuration is further included, and the determination of full configuration or delta configuration is made in the sequence illustrated in FIG. 9.

According to the above-described examples, the network node can correctly determine whether the inter-node message from the MN is a full configuration execution request or a delta configuration execution request in any use case, and can configure appropriately the configuration. In addition, the network node can reduce unnecessary signaling in the process of determination whether it is the full configuration execution request or the delta configuration execution request.

That is, the network node appropriately configures the information related to the configuration of the user device to another network node, and the user device can continue the communication.

(Device Configuration)

Next, a functional configuration example of the base station device 10 and the user device 20 that execute the processing and operations explained so far will be described. The base station device 10 and the user device 20 include functions performing the examples described above. However, the base station device 10 and the user device 20 may include a part of the functions in the examples.

<Base Station Device 10>

Figure 12:
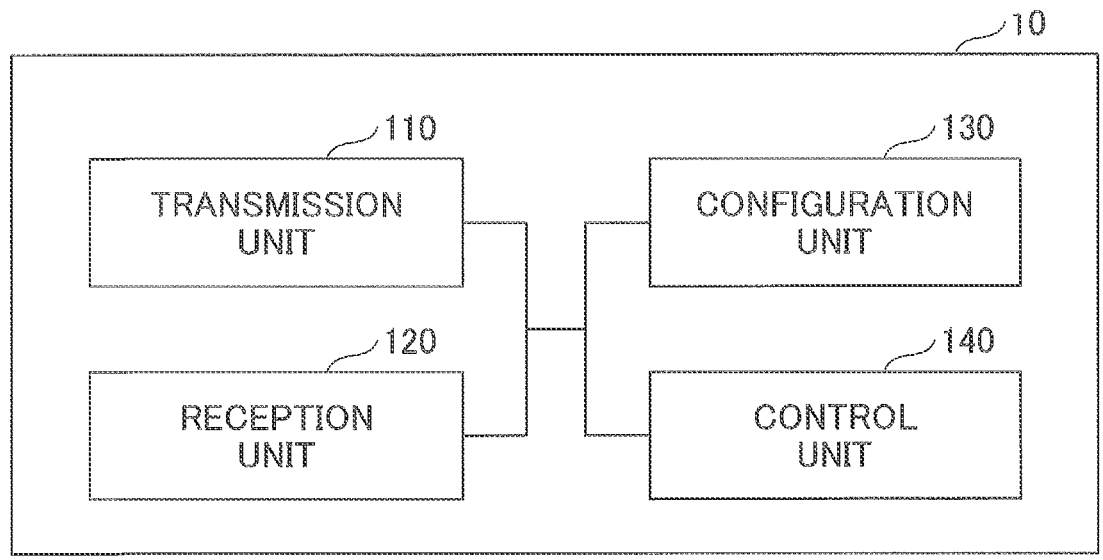
FIG. 12 is a diagram illustrating an example of a functional configuration of a base station device 10 according to an embodiment of the present invention.

FIG. 12 is a diagram illustrating a functional configuration example of the base station device 10. As illustrated in FIG. 12, the base station device 10 includes a transmission unit 110, a reception unit 120, a configuration unit 130 and a control unit 140. The functional configuration illustrated in FIG. 12 is merely an example. As long as the operations according to the embodiment of the present invention can be executed, the function division and the name of the functional unit may be anything.

The transmission unit 110 includes a function of generating a signal to be transmitted to the side of the user device 20 and wirelessly transmits the signal. In addition, the transmission unit 110 transmits an inter-network node message to another network node. The reception unit 120 includes a function of receiving various signals transmitted from the user device 20 and acquiring, for example, information of a higher layer from the received signals. In addition, the transmission unit 110 has a function of transmitting NR-PSS, NR-SSS, NR-PBCH, DL/UL control signals and the like to the user device 20. The reception unit 120 receives the inter-network node message from another network node.

The configuration unit 130 stores configuration information set in advance and various configuration information to be transmitted to the user device 20 in the storage unit and reads them from the storage unit as necessary. The content of the configuration information is, for example, configuration information related to communication of the user device 20 such as a configuration of a radio bearer or a secondary cell.

As described in the examples, the control unit 140 controls communication to which the user device 20 and the EN-DC are applied. Further, the control unit 140 acquires a configuration related to the communication of the user device 20 from another network node or notifies the other network of the configuration. Further, the control unit 140 configures delta configuration or full configuration for the configuration related to the communication of the user device 20. A function unit related to signal transmission in the control unit 140 may be included in the transmission unit 110 and a function unit related to signal reception in the control unit 140 may be included in the reception unit 120.

<User Device 20>

Figure 13:
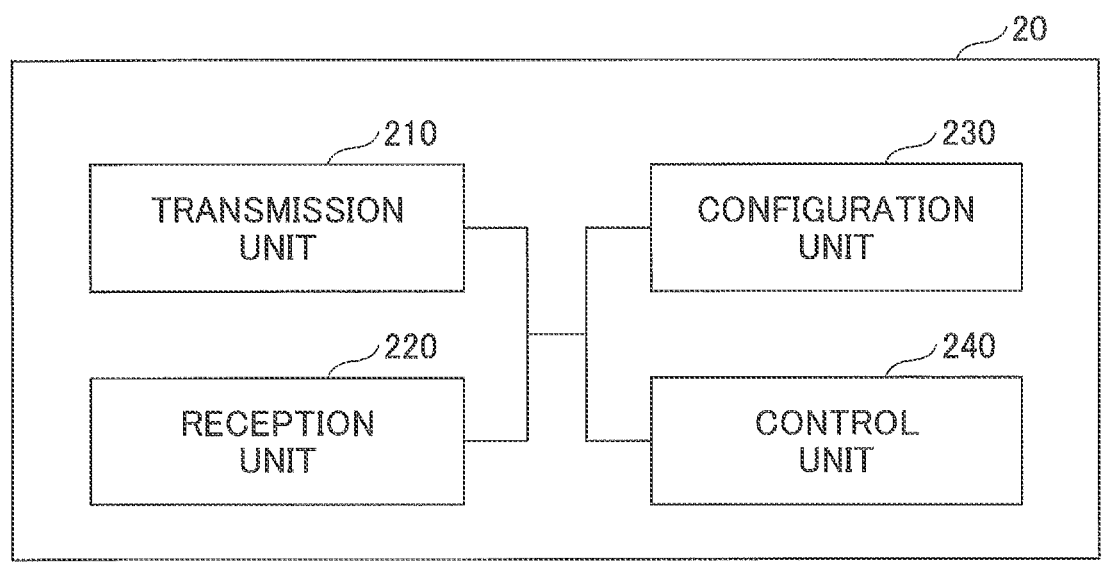
FIG. 13 is a diagram illustrating an example of a functional configuration of a user device 20 according to an embodiment of the present invention.

FIG. 13 is a diagram illustrating a functional configuration example of the user device 20. As illustrated in FIG. 13, the user device 20 includes a transmission unit 210, a reception unit 220, a configuration unit 230 and a control unit 240. The functional configuration illustrated in FIG. 13 is merely an example. As long as the operation according to the embodiment of the present invention can be executed, the function division and the name of the functional unit may be anything.

The transmission unit 210 generates a transmission signal from transmission data and wirelessly transmits the transmission signal. The reception unit 220 wirelessly receives various signals and acquires a signal of a higher layer from the signal of the received physical layer. In addition, the reception unit 220 has a function of receiving NR-PSS, NR-SSS, NR-PBCH, DL/UL/SL control signals and the like transmitted from the base station device 10. Further, for example, the transmission unit 210 may transmit PSCCH (Physical Sidelink Control Channel), PSSCH (Physical Sidelink Shared Channel), PSDCH (Physical Sidelink Discovery Channel), PSBCH (Physical Sidelink Broadcast Channel) and the like. The reception unit 120 receives PSCCH, PSSCH, PSDCH, PSBCH, and the like from another user device 20.

The configuration unit 230 stores various kinds of configuration information received from the base station device 10 or the user device 20 by the receiving unit 220 in the storage unit and reads them from the storage device as necessary. In addition, the configuration unit 230 also stores preset configuration information. The content of the configuration information is, for example, configuration information related to communication of the user device 20 such as a configuration of a radio bearer or a secondary cell.

As described in the example, the control unit 240 performs wireless communication to which EN-DC is applied. Further, the control unit 240 receives information related to radio communication from the base station device 10, controls the radio communication of the user device 20 based on the information, and reports necessary information to the base station device 10. A functional unit related to signal transmission in the control unit 240 may be included in the transmission unit 210 and a functional unit related to signal reception in the control unit 240 may be included in the reception unit 220.

(Hardware Configuration)

The block diagrams used in the description of the above embodiments (FIGS. 12 and 13) illustrate blocks in the units of functions. These functional blocks (constituent units) are embodied in a combination of hardware and/or software. In addition, means for embodying the functional blocks is not particularly limited. That is, each functional block may be embodied by one unit in which a plurality of elements is physically and/or logically coupled, or may be embodied by two or more units which are physically and/or logically separated and which are connected directly and/or indirectly (for example, in a wired and/or wireless manner).

Figure 14:
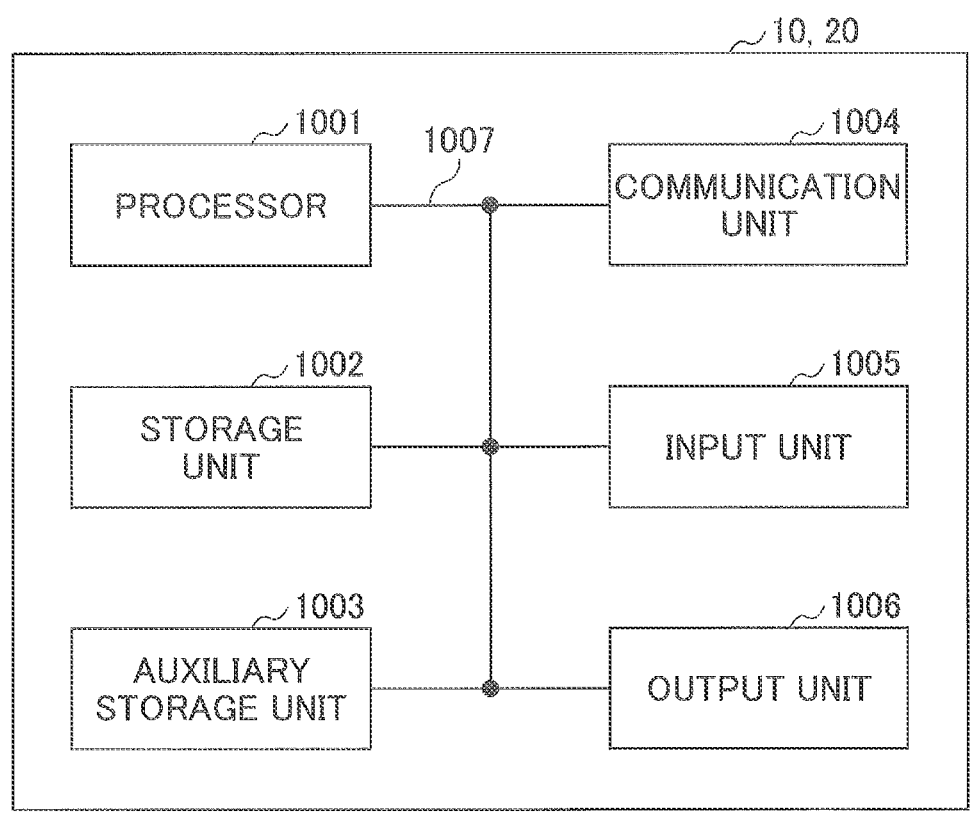
FIG. 14 is a diagram illustrating an example of a hardware configuration of the base station device 10 or the user device 20 according to an embodiment of the present invention.

In addition, for example, both the base station device 10 and the user device 20 in an embodiment of the present invention may function as computers that perform the processes according to the embodiment of the invention. FIG. 14 is a diagram illustrating a hardware configuration example of a wireless communication device of the base station device 10 or the user device 20 according to the present embodiment. The base station device 10 and the user device 20 described above may be respectively physically configured as a computer device including a processor 1001, a storage unit 1002, an auxiliary storage unit 1003, a communication unit 1004, an input unit 1005, an output unit 1006, and a bus 1007, and the like.

It is noted that in the following description, a word "unit" may be referred to as a circuit, a device, a unit, or the like. The hardware configurations of the base station device 10 and the user device 20 may include one or more of units illustrated with 1001 to 1006 illustrated in the drawing or may not include some units.

The functions of the base station device 10 and the user device 20 are implemented by causing hardware such as the processor 1001 and the storage unit 1002 to read predetermined software (a program) and causing the processor 1001 to perform computation and to control communication of the communication unit 1004 and reading and/or writing of data in the storage unit 1002 and the auxiliary storage unit 1003.

The processor 1001 controls the computer as a whole, for example, by operating an operating system. The processor 1001 may be constituted by a central processing unit (CPU) including an interface with peripherals, a control unit, a calculation unit, a register, and the like.

In addition, the processor 1001 reads a program (program codes), a software module, or data from the auxiliary storage unit 1003 and/or the communication unit 1004 to the storage unit 1002 and performs various processes in accordance therewith. As the program, a program causing a computer to perform at least a part of the operations in the embodiment described above is used. For example, the transmission unit 110, the reception unit 120, the configuration unit 130 and the control unit 140 of the base station device illustrated in FIG. 12 may be embodied by a control program which is stored in the storage unit 1002 and operated by the processor 1001. In addition, for example, the transmission unit 210, the reception unit 220, the configuration unit 230 and the control unit 240 of the user device illustrated in FIG. 13 may be embodied by a control program which is stored in the storage unit 1002 and operated by the processor 1001. Various processes described above have been described to be performed by a single processor 1001, but may be simultaneously or sequentially performed by two or more processors 1001. The processor 1001 may be mounted as one or more chips. It is noted that the program may be transmitted from a network via an electric communication line.

The storage unit 1002 is a computer-readable recording medium and may be constituted, for example, by at least one of a read only memory (ROM), an erasable programmable ROM (EPROM), an electrically erasable programmable ROM (EEPROM), a random access memory (RAM), and the like. The storage unit 1002 may be referred to as a register, a cache, or a main memory (a main storage unit). The storage unit 1002 can store a program (program codes), a software module, or the like which can be used to perform the processes according to an embodiment of the present invention.

The auxiliary storage unit 1003 is a computer-readable recording medium and may be constituted, for example, by at least one of an optical disc such as a compact disc ROM (CD-ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, a magnetic strip, and the like. The auxiliary storage unit 1003 may be referred to as an auxiliary storage unit. The recording medium described above may be for example a database including the storage unit 1002 and/or the auxiliary storage unit 1003, a server, and another appropriate medium.

The communication unit 1004 is hardware (a transceiver device) that allows communication between computers via a wired and/or wireless network and is referred to as, for example, a network device, a network controller, a network card, a communication module, or the like. For example, the transmission unit 110 and the reception unit 120 of the base station device 10 may be embodied by the communication unit 1004. In addition, the transmission unit 210 and the reception unit 220 of the user device 20 may be embodied by the communication unit 1004.

The input unit 1005 is an input device (such as a keyboard, a mouse, a microphone, a switch, a button, or a sensor) that receives an input from the outside. The output unit 1006 is an output device (such as a display, a speaker, or an LED lamp) that performs outputting to the outside. It is noted that the input unit 1005 and the output unit 1006 may be constituted as a unified body (such as a touch panel).

In addition, the units such as the processor 1001 and the memory 1002 are connected to each other via the bus 1007 for communicating information. The bus 1007 may be constituted by a single bus or may be constituted by different buses between the units.

In addition, the base station device 10 and the user device 20 may be respectively configured to include hardware such as a microprocessor, a digital signal processor (DSP), an application specific integrated circuit (ASIC), a programmable logic device (PLD), or a field programmable gate array (FPGA) or a part or all of the functional blocks may be embodied by the hardware. For example, the processor 1001 may be mounted as at least one such hardware module.

Conclusion of the Embodiments

As described above, according to the embodiments of the present invention, there is provided a first network node of a communication system including a user device and a plurality of network nodes, the first network node including a reception unit that receives an inter-node message relating to a configuration of the user device from a second network node, a determination unit that determines whether a manner of updating the configuration of the user device is a full configuration or a delta configuration based on the inter-node message; and an updating unit that updates the configuration of the user device with the full configuration or the delta configuration based on the determination.

With the above configuration, the network node can correctly determine whether the inter-node message from an MN is the full configuration execution request or the delta configuration execution request even in any use case, and appropriately configure the configuration. In addition, the network node can reduce unnecessary signaling in the process of determination whether it is the full configuration execution request or the delta configuration execution request. That is, the network node appropriately configures the information related to the configuration of the user device to another network node, and the user device can continue the communication.

The inter-node message may include information indicating that a method of updating the configuration of the user device is the full configuration. With this configuration, the network node can correctly determine whether the inter-node message from the MN is the full configuration execution request or the delta configuration execution request.

The second network node may be a master node and the first network node may be a secondary node and the inter-node message need not include an indication to change the first network node. With this configuration, the network node can correctly determine whether the inter-node message from the MN is the full configuration execution request or the delta configuration execution request, even if it is an operation in which the SN is not changed.

The inter-node message may be a secondary node addition request. With this configuration, if "SgNB Addition Request" is transmitted from the MN to the SN, the network node can correctly determine whether it is the full configuration execution request or the delta configuration execution request.

The inter-node message may be a secondary node modification request. With this configuration, if "SgNB Modification Request" is transmitted from the MN to the SN, the network node can correctly determine whether it is the full configuration execution request or the delta configuration execution request.

The reception unit may receive, from the second network node, a query on a configuration of the user device, and the network node may further include a transmission unit for transmitting a response to the query to the second network node. Upon receiving, from the second network node, a message including an identifier included in the response to the query, the network node may configure the full configuration based on a type of the message including the identifier included in the response to the query. According to this configuration, after "Query Indication" is transmitted from the MN to the SN, if a message from the MN including an ID that was transmitted in the response from the SN to the MN is received by the SN, the network node could correctly determine whether it is the full configuration execution request or the delta configuration execution request based on the type of the message.

Supplement to the Embodiment

While the embodiment of the present invention has been described above, the disclosed inventions are not limited to the embodiment, and it could be understood by those skilled in the art that various modifications, corrections, alternatives, replacements, and the like can be made thereto. While specific numerical examples have been used to facilitate understanding of the invention, the numerical values are just an example and appropriate values may be used, unless otherwise specified. Divisions of the described items in the above description are not essential to the present invention, and details described in two or more articles may be combined for use if necessary, or details of a certain article may be applied to details described in another article (unless incompatible). The boundaries of the functional units or the processing units in the functional block diagrams do not necessarily correspond to boundaries of physical components. The operations of two or more functional units may be performed by a single physical component or the operation of a single functional unit may be performed by two or more physical components. Regarding the processing procedure described in the embodiment, the order of processing may be changed as long as there is no contradiction. For convenience of processing explanation, the base station device and the user device have been described using the functional block diagrams, but such devices may be embodied in hardware, software, or a combination thereof. Software operating by the processor of the base station device according to the embodiment of the present invention and software operating by the processor of the user device according to the embodiment of the present invention may be respectively stored in a random access memory (RAM), a flash memory, a read only memory (ROM), an EPROM, an EEPROM, a register, a hard disk (HDD), a removable disk, a CD-ROM, a database, a server, or any other appropriate storage medium.

In addition, notification of information is not limited to the aspect/embodiment described in the specification, but may be performed using another manner. For example, the notification of information may be performed using physical layer signaling (for example, downlink control information (DCI) or uplink control information (UCI)), upper layer signaling (for example, radio resource control (RRC) signaling, medium access control (MAC) signaling, or broadcast information (master information block (MIB) and system information block (SIB))), other signals, or combinations thereof. In addition, the RRC signaling may be referred to as an RRC message and may be, for example, an RRC connection setup message or an RRC connection reconfiguration message.

The aspect/embodiment described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which these systems are extended.

The processing procedures, the sequences, the flowcharts, and the like of the aspects/embodiments described in the specification may be changed in the order as long as they are not incompatible with each other. For example, in the method described in the specification, various steps are described in an exemplary order and the method is not limited to the described specific order.

Specific operations which are performed by the base station device in the specification may be performed by an upper node thereof in some cases. In a network including one or more network nodes including the base station device, various operations which are performed to communicate with the user device can clearly be performed by the base station device and/or network nodes (for example, an MME or an S-GW can be considered but the network nodes are not limited thereto) other than the base station device. A case in which the number of network nodes, other than the base station device, is one has been described above; however, a combination of plural different network nodes (for example, an MME and an S-GW) may be used.

The respective aspects/embodiments described in the specification may be used alone, may be used in combination, or may be switched with implementation thereof.

The user equipment UE may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station device may be referred to as a NodeB (NB), an evolved NodeB (eNB), a Next generation NodeB (gNB), a base station, or some other appropriate terms by those skilled in the art.

As used in the specification, the terms "determining" and "deciding" may include various types of operations. For example, "determining" and "deciding" may include deeming that to perform judging, calculating, computing, processing, deriving, investigating, looking up (for example, search in a table, a database, or another data structure), or ascertaining is to perform "determining" or "deciding". In addition, "determining" and "deciding" may include deeming that to perform receiving (for example, reception of information), transmitting (for example, transmission of information), input, output, or accessing (for example, accessing data in memory) is to perform "determining" or "deciding". Further, "determining" and "deciding" may include deeming that to perform resolving, selecting, choosing, establishing, comparing, or the like is to perform "determining" or "deciding". Namely, "determining" and "deciding" may include deeming that some operation is to perform "determining" or "deciding".

As used in the specification, an expression "on the basis of" does not refer to "on the basis of only," unless otherwise specified. In other words, the expression "on the basis of" refers to both "on the basis of only" and "on the basis of at least."

As long as terms "include" and "including" and modifications thereof are used in the specification or the appended claims, these terms are intended to have a comprehensive meaning similar to a term "comprising." A term "or" which is used in the specification or the claims is intended not to mean an exclusive or.

In the entire disclosure, for example, when an article such as a, an, or the is added in translation into English, such an article may refer to including the plural unless otherwise recognized from the context.

It is noted that, in the embodiment of the present invention, the control unit 140 is an example of a determination unit or an updating unit.

The "SgNB Addition Request" is an example of a request for adding a secondary node. The "SgNB Modification Request" is an example of a request for changing a secondary node. The "Query Indication" is an example of a query on a configuration of a user device. The SgNB-UE-X2AP-ID is an example of an identifier included in a response to the query. The SN is an example of a first network node. The MN is an example of a second network node.

Although the present invention is described above in detail, it is obvious to those skilled in the art that the present invention is not limited to the embodiments described in the specification. The present invention can be implemented as modifications and alterations without departing from the gist and scope of the present invention defined in claims set forth below. Accordingly, the description of the specification is intended to be exemplary and does not have any restrictive meaning to the present invention.

LIST OF REFERENCE SYMBOLS 10 base station device
110 transmission unit
120 reception unit
130 configuration unit
140 control unit
20 user device
210 transmission unit
220 reception unit
230 configuration unit
240 control unit
1001 processor
1002 storage unit
1003 auxiliary storage unit
1004 communication unit
1005 input unit
1006 output unit

The invention claimed is:

1. A first network node of a communication system including a terminal and a plurality of network nodes, the first network node comprising:
a receiver that receives an inter-node message relating to a configuration of the terminal from a second network node; and
a processor that determines whether a method of updating the configuration of the terminal is a full configuration or a delta configuration based on the inter-node message and updates the configuration of the terminal with the full configuration or the delta configuration based on the determination,
wherein the first network node is a secondary node provided by a New Radio (NR) system and the second network node is a master node provided by a Long Term Evolution (LTE) system, and
wherein the inter-node message includes CG-ConfigInfo, and
wherein the processor determines that the method of updating the configuration of the terminal is the delta configuration in response to detecting that the CG-ConfigInfo includes an information element scg-RB-Config and that the CG-ConfigInfo does not include an Indication indicating an execution request of the full configuration, the processor determines that the method of updating the configuration of the terminal is the delta configuration in response to detecting that the CG-ConfigInfo does not include the information element scg-RB-Config and that the CG-ConfigInfo does not include the Indication indicating the execution request of the full configuration, and the processor determines that the method of updating the configuration of the terminal is the full configuration in response to detecting that the CG-ConfigInfo does not include the information element scg-RB-Config and that the CG-ConfigInfo includes the Indication indicating the execution request of the full configuration.

2. The first network node according to claim 1, wherein the inter-node message includes information indicating that the method of updating the configuration of the terminal is the full configuration.

3. The first network node according to claim 1, wherein the receiver receives a query on the configuration of the terminal from the second network node,
wherein the first network node further includes a transmitter that transmits a response to the query to the second network node, and
wherein, upon receiving, from the second network node, a message including an identifier included in the response to the query, the full configuration is configured based on a type of the message including the identifier included in the response to the query.

* * * * *